United States Patent Office 3,309,342
Patented Mar. 14, 1967

3,309,342
POLYURETHANES PREPARED FROM PHOSPHORUS CONTAINING MANNICH CONDENSATION PRODUCTS
Lester Friedman, Beachwood, Ohio, assignor to Union Carbide Corporation, a corporation of New York
No Drawing. Original application May 21, 1963, Ser. No. 282,118. Divided and this application Aug. 23, 1965, Ser. No. 491,070
8 Claims. (Cl. 260—77.5)

This application is a division of my copending application Serial No. 282,118, filed May 21, 1963.

The present invention relates to the preparation of novel Mannich type condensation products and to the preparation of novel polyurethanes.

In the past it has been proposed to prepare Mannich bases of the aminomethylphosphonate type by reacting a dialkyl or diaryl phosphite, formaldehyde and a dialkyl or diaryl amine, see Fields Patent 2,635,112 and Sallman Patent 2,847,442. It has also been proposed to form dialkyl or dihaloalkyl N,N'-dialkanolamine methylphosphonates by reacting a dialkyl or dihaloalkyl phosphite with formaldehyde and a dialkanolamine, e.g., diethanolamine.

It is an object of the present invention to prepare novel phosphonates.

Another object of the invention is to prepare flame resistant polyurethanes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting a bis(polyhydric alcohol) phosphite with an aldehyde or ketone and a primary or secondary amine to form a phosphonate.

The phosphonates of the present invention are useful as hydraulic fluids, as chelating agents, for reaction with polybasic acids, e.g., maleic acid, adipic acid or phthalic acid (or anhydride) to form polyesters, as amine catalysts and reactants in epoxy systems, e.g., bisphenol A-epichlorohydrin resins, and especially for reaction with organic polyisocyanates to form polyurethanes either as rigid or flexible foams or as elastomers.

Particularly valuable compounds are prepared when the amine employed is a dialkanolamine so that the phosphonate formed has four available hydroxy groups.

Illustrative compounds within the invention have the formulae

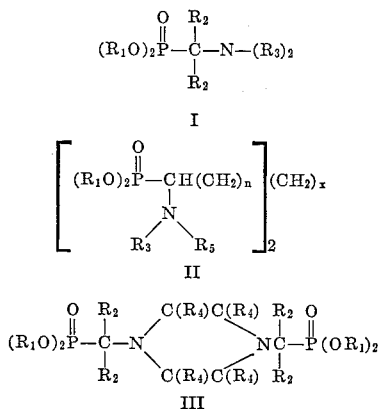

$R_1O$ is the residue of an oxyalkylated polyhydric alcohol, preferably having 2 to 8 hydroxyl groups, from which one of the alcoholic hydrogen atoms from one group is removed. Preferably $R_1$ is the residue of a polypropylene glycol, most preferably a residue of dipropylene glycol.

$R_2$ is hydrogen, alkyl, alkenyl, furyl, or carbocyclic aryl. Most preferably $R_2$ is hydrogen.

$R_3$ is alkyl, aryl or hydroxyalkyl. Preferably $R_3$ is hydroxyalkyl.

$R_4$ is hydrogen or alkyl.

$R_5$ is hydrogen, alkyl, aryl or hydroxyalkyl. Most preferably $R_5$ is hydroxyalkyl.

$n$ is 0 or an integer and $x$ is 0 or 1.

In addition to the compounds set forth in Formulae I, II, and III, the invention also embraces products made from aliphatic polyamines containing at least two primary and/or secondary amino groups, an aldehyde or ketone and a bis(polyhydric alcohol) hydrogen phosphite.

Furthermore, the invention embraces Mannich bases prepared from polymeric hydrogen phosphites having a plurality of polyalkylene glycol residues. Such compounds include materials having the formula

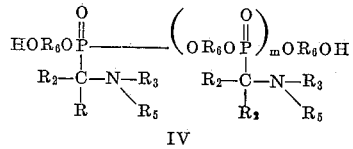

IV where $R_6$ is a lower alkylene group, e.g., ethylene, propylene, trimethylene or butylene, $m$ is an integer of at least 1, e.g., 1, 2, 3, 4, or 5, and $R_2$, $R_3$ and $R_5$ are as defined above.

As starting phosphites there can be used bis(dipropylene glycol) hydrogen phosphite, bis(tripropylene glycol) hydrogen phosphite, bis(tetrapropylene glycol) hydrogen phosphite, bis(polypropylene glycol 425) hydrogen phosphite, bis(polypropylene glycol 1025) hydrogen phosphite, bis(polypropylene glycol 2025) hydrogen phosphite, bis(diethylene glycol) hydrogen posphite, bis(triethylene glycol) hydrogen phosphite, bis(tetraethylene glycol) hydrogen phosphite, bis(polyethylene glycol 2000) hydrogen phosphite, bis(dibutylene glycol) hydrogen phosphite, tris dipropylene glycol dihydrogen diphosphite, tetrakis dipropylene glycol trihydrogen phosphite, tris diethylene glycol dihydrogen diphosphite, bis(ditetramethylene glycol) hydrogen pohsphite, bis(polyethylene glycol-polypropylene glycol) hydrogen phosphite (where the polyethylene glycol-polypropylene glycol grouping has a molecular weight of 1500 and contains a random mixture of alkyleneoxy groups as a result of reacting phosphorous acid with a mixture of 90% propylene oxide and 10% ethylene oxide), bis(4-hydroxybutyl) hydrogen phosphite, bis(LK 380) hydrogen phosphite (the phosphite prepared by reacting phosphorous acid with an excess of polyhydric alcohol Niax LK 380 which is a mixture of (a) 1,1,3-tris[(2-hydroxypropoxy) phenyl] propane and (b) glycerine-propylene oxide adduct Mol Wt. 260–270, the mixture of (a) and (b) having a hydroxyl number of 380), bis(PeP 450) hydrogen phosphite (PeP is an abbreviation for the tetrapropylene oxide adduct of pentaerythritol; the number 450 designating the molecular weight of the adduct), bis(PeP 400) hydrogen phosphite, bis(PeP 600) hydrogen phosphite; bis[tris (2-hydroxypropoxy) propane] hydrogen phosphite, bis(LG-56) hydrogen phospite (LG-56 is a propylene oxide-glycerine adduct molecurar weight 3000), bis[octakis (2-hydroxypropyl) sucrose] hydrogen phosphite (bis(Voranol RS-530) hydrogen phosphite), bis(propylene oxide-1,2,6 hexanetriol adduct) hydrogen phosphite wherein the adduct has a molecular weight of 750 (bis LHT 240 hydrogen phosphite), and the corresponding secondary phosphites of adducts of propylene oxide and 1,2,6-hexanetriol having molecular weights of 1500, 2400 and 4000 (bis LHT 112 hydrogen phosphite, bis LHT 67 hydrogen phosphite and bis LHT 42 hydrogen phosphite respectively), bis(LG 168) hydrogen phosphite (LG 168 is a propylene oxide-glycerine adduct molecular weight 1000), bis(sorbitol-propylene oxide adduct molecular weight 1000) hydrogen phosphite, bis(trimethylolpropane-propylene oxide adduct molecular weight 1700) hydrogen phosphite, bis(ethylene oxide-glycerine adduct molecular weight 1000) hydrogen phosphite, bis(LS 490) hydrogen phosphite, bis(LS 550) hydrogen phosphite, bis(LS 650) hydrogen phosphite (the initials LS signify the polyol is a sorbitol-propylene oxide adduct and the numbers 490, 550, and 650 indicate the hydroxyl number of the respective adducts), bis(propylene oxide-amine adducts) hydrogen phosphite, bis(trimethylolpropane-propylene oxide adduct) hydrogen phosphites wherein the trimethylolpropane-propylene oxide adduct has a molecular weight of 300, 400, 700, 1500, 2500 or 4000, bis(ethylene oxidepropylene oxide adduct) hydrogen phospite wherein the adduct has a molecular weight of 1000 and is a block copolymer of ethylene oxide and propylene oxide, bis(PeP 1000) hydrogen phosphite (PeP 1000 being the adduct of pentaerythritol and propylene oxide having a molecular weight of 1000). The presently preferred phosphite is bis(dipropylene glycol) hydrogen phosphite.

The polyol secondary phosphites employed as starting materials can be prepared in the manner set forth in my application 201,240 filed June 11, 1962, now Patent 3,139,450. The bis(dialkylene glycol) hydrogen phosphites having 2 to 4 carbon atoms in the alkylene group can be prepared by reacting the appropriate alkylene oxide, e.g. ethylene oxide, propylene oxide or butylene oxide in an amount of at least 2 moles with 1 mole of phosphorous acid, e.g. see Adams Patent 2,372,244. By using a mixture of alkylene oxides a mixture of bis(dialkylene glycol) hydrogen phosphites will be produced. Such mixture can be employed to prepare the compounds of the present invention.

All of the polyol secondary phosphites employed as starting materials can be prepared conveniently by the following methods:

(1) Transesterification with a suitable dialkyl or diaryl hydrogen phosphite, e.g. diethyl phosphite, didecyl phosphite or diphenyl phosphite.

(2) Partial hydrolysis of a suitable tertiary phosphite, e.g. tris (polypropylene glycol 2025) phosphite, tris (Voranol CP 260) phosphite, tris (PeP 450) phosphite.

(3) Controlled reaction of the appropriate polyol, e.g. dipropylene glycol, polyethylene glycol 2000, with phosphorus trichloride and water.

Polymeric hydrogen phosphites containing repeating dipropylene glycol, diethylene glycol or dibutylene glycol groups or mixtures thereof can be prepared by any of the aforementioned methods or by controlled polymerization of the bis(dialkylene glycol) hydrogen phosphite monomer by removing the required amount of glycol by distillation.

As carbonyl compounds there can be used aldehydes and ketones such as formaldehyde, acetaldehyde, propionaldehyde, isobutyraldehyde, butyraldehyde, valeraldehyde, caprylaldehyde, stearaldehyde, acrolein, crotonaldehyde, benzaldehyde, furfural, glyoxal, glutaraldehyde, succinaldehyde, acetone, methyl ethyl ketone, oleylaldehyde, acetophenone. The preferred carbonyl compound is formaldehyde because it is the most reactive and is relatively inexpensive.

As the amine there can be used primary or secondary amines such as methyl amine, ethyl amine, propyl amine, butyl amine, lauryl amine, octadecyl amine, allyl amine, aniline, morpholine, piperidene, cyclohexyamine, ethanolamine, propanolamine, butanolamine, dimethyl amine, diethyl amine, dipropyl amine, diisopropylamine, dibutyl amine, dicyclohexyl amine, p-anisidine, methyl aniline, dilauryl amine, dioctadecylamine, diallyl amine, dimethallyl amine, piperidine, homopiperazine, 2-methyl-piperazine, 2,3-dimethyl piperazine, diethylene triamine, triethylene tetramine, tetraethylene pentamine, ethylene diamine, hexamethylene diamine, N,N'-dimethyl ethylenediamine, diethanolamine, dipropanolamine, dibutanolamine, diisopropanolamine, ethanol-propanolamine, dioctanolamine. The preferred amines are secondary amines with the most preferred being dialkanolamines, as previously set forth.

Illustrative examples of compounds within the present invention are bis(dipropylene glycol) diethylaminomethane phosphonate,
bis(dipropylene glycol) dimethyl aminomethanephosphonate,
bis(dipropylene glycol) dioctadecylaminomethanephosphonate,
bis(dipropylene glycol) diallylaminomethanephosphonate,
bis(diproylene glycol) dimethallylaminomethanephosphonate,
bis(diethylene glycol) diallylaminomethanephosphonate,
bis(dipropylene glycol) dioctadecenylaminomethanephosphonate,
bis(di-propylene glycol) butylaminomethanephosphonate,
bis(dipropylene glycol) ethanolaminomethanephosphonate,
bis(dipropylene glycol)anilinomethanephosphonate,
bis(dipropylene glycol) N-methylanilinomethanephosphonate,
bis(dipropylene glycol) bis-(2-hydroxyethyl) aminomethanephosphonate,
bis(dipropylene glycol) bis-(3-hydroxypropyl) aminomethanephosphonate,
bis(diproylene glycol) bis-(2-hydroxypropyl) aminomethanephosphonate,
bis(dipropylene glycol) bis-(8-hydroxyoctyl) aminomethanephosphonate,
bis(diethylene glycol) bis(2-hydroxyethyl) aminomethanephosphonate,
bis(diethylene glycol) bis(3-hydroxypropyl)aminomethanephosphonate,
bis(tripropylene glycol) bis(2-hydroxyethyl)-aminomethanephosphonate,
bis(polypropyelne glycol 425) bis(2-hydroxyethyl) methanephosphonate,
bis(polypropylene glycol 1025) bis(2-hydroxypropyl) aminomethanephosphonate,
bis(polypropylene glycol 2025) bis(4-hydroxylbutyl)-aminomethanephosphonate,
bis(ditetramethylene glycol) bis(2-hydroxyethyl) aminomethanephosphonate,
bis(di-1,2-butylene glycol) bis(2-hydroxyethyl) aminomethanephosphonate,
bis(tetrapropylene glycol) bis(2-hydroxyethyl)-aminomethanephosphonate,
bis(LK-380) bis(2-hydroxyethyl) aminomethanephosphonate,
bis(PeP 450) bis(2-hydroxyethyl) aminomethanephosphonate,
bis(PeP 600) (3-hydroxypropyl) aminomethanephosphonate,
bis [tris (2-hydroxypropoxy) propane] bis(2-hydroxyethyl) aminomethanephosphonate having the formula

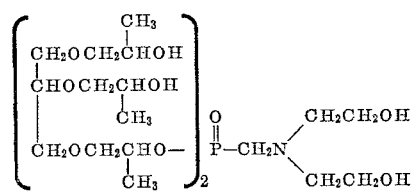

bis(LG-56) bis(2-hydroxyethyl) aminomethanephosphonate,
bis(LG-168) bis(2-hydroxypropyl) methanephosphonate,
bis(Voranol RS-530) bis(2-hydroxyethyl) aminomethanephosphonate,
bis(LHT 240) bis(2-hydroxyethyl) aminomethanephosphonate,
bis(LHT 42) bis(2-hydroxyethyl) aminomethanephosphonate,
bis(LHT 112) bis(3-hydroxypropyl)-aminomethanephosphonate,
bis(LS 490) bis(2-hydroxyethyl) aminomethanephosphonate,
bis(LS 550) bis(2-hydroxyethyl) aminomethanephosphonate,
bis(LS 650) diethylaminomethanephosphonate,
bis(trimethylolpropane-propylene oxide adduct molecular weight 400) bis(2-hydroxyethyl-aminomethanephosphonate,
bis(trimethylolpropane-propylene oxide adduct molecular weight 700) diallylaminomethanephosphonate,
bis(trimethylolpropane-propylene oxide) bis(2-hydroxyethyl) aminomethanephosphonate,
bis(polyethylene glycol-polypropylene glycol molecular weight 1500 with 90% propylene oxide units) bis(2-hydroxyethyl) aminomethanephosphonate,
tris(dipropylene glycol) di [bis(2-hydroxyethyl) aminomethanephosphonate],
tetrakis(dipropylene glycol) tri [bis(2-hydroxyethyl) aminomethanephosphonate],
tris(diethylene glycol) di[bis(3-hydroxypropyl) aminomethanephosphonate],
tris(dibutylene glycol) di[bis(2-hydroxyethyl) aminomethanephosphonate],
1,4-bis[bis(dipropylene glycol)-phosphonatemethyl] piperazine (also called tetrakis dipropylene glycol piperazine-1,4-bis(methanephosphonate)),
the reaction product of 1 mol of tris(dipropylene glycol) dihydrogen diphosphite with 2 moles of formaldehyde and 1 mol of piperazine,
the reaction product of tris(dipropylene glycol) dihydrogen diphosphite with formaldehyde and tetraethylene pentamine,
bis(dipropylene glycol) bis(2-hydroxyethyl) aminoethanephosphonate,
bis(diethylene glycol) bis(2-hydroxyethyl aminomethanephosphonate,
bis(PeP 600) bis(2-hydroxyethyl) aminoethanephosphonate,
bis(dipropylene glycol) diamylaminoethanephosphonate,
bis(dipropylene glycol) diallylaminobutanephosphonate,
bis(dipropylene glycol) bis(2-hydroxyethyl) aminooctadecanephosphonate,
bis(dipropylene glycol) bis(2-hydroxyethyl) amino (phenyl) methanephosphonate,
bis(dipropylene glycol) 2-bis(2-hydroxyethyl) aminopropanephosphonate,
bis(dipropylene glycol) 2-bis(2'-hydroxyethyl) aminobutanephosphonate,
bis(dipropylene glycol) bis(2-hydroxyethyl) aminofurylmethanephosphonate,
bis(dipropylene glycol) bis (2-hydroxyethyl) aminopropenephosphonate,
bis(diethylene glycol) bis 2'(2'-hydroxyethyl) aminobutenephosphonate,
bis(dipropylene glycol) 1,5-di[bis (2'-hydroxyethyl) amino] 1,5-pentanediphosphonate.

Unless otherwise indicated all parts and percentages are by weight.

*Example 1*

628 grams (2 mols) of bis-(dipropyleneglycol) hydrogenphosphite were heated at 5–10 mm. pressure and the dipropylene glycol formed was removed overhead at 110–111° C./10 mm. until 133 grams (1 mol) were collected. The clear, colorless viscous liquid residue had the average composition of tris dipropylene glycol dihydrogendiphosphite.

By replacing the bis(dipropylene glycol) hydrogen phosphite with 1 mol of bis(diethylene glycol) hydrogen phosphite there was produced tris(diethylene glycol) dihydrogen diphosphite and by utilizing bis (1,2-dibutylene glycol) hydrogen phosphite as the replacement there was produced tris (1,2-dibutylene glycol) dihydrogen diphosphite. By using a mixture of bis (dipropylene glycol) hydrogen phosphite and bis (diethylene glycol) hydrogen phosphite there was produced a mixed tris (dialkylene glycol) dihydrogen diphosphite in which the alkylene groups contained 2 to 3 carbon atoms.

Tris (dipropylene glycol) dihydrogen diphosphite was made alternatively by heating 3 moles of dipropylene glycol with 2 moles of triphenyl phosphite, removing the phenol formed until 4 moles of phenol were removed and then hydrolysis of the product with water followed by removal of the water as well as 2 more moles of phenol.

*Example 1a*

628 grams (2 moles) of bis (dipropylene glycol) hydrogen phosphite were heated in vacuo at 5 to 10 mm. pressure in a vessel suitable for distillation. Dipropylene glycol was removed overhead at 110 to 115° C./10 mm. until 188 grams (1.33 moles) were collected. The clear, colorless residue had the average composition of tetrakis dipropylene glycol trihydrogentriphosphite.

*Example 2*

To 73 grams (1 mole) of diethylamine was added with cooling and stirring to maintain a temperature of 30 to 40° C. 75 grams (1 mole) of 40% aqueous formaldehyde. There was then added 314 grams (1 mole) of bis (dipropylene glycol) hydrogen phosphite. After the exothermic reaction was completed (30 minutes), the mixture was heated in vacuo to remove volatiles, gradually raising the temperature of the reaction product to about 90° C. at 10 mm. The resulting clear amber liquid was essentially pure bis (dipropylene glycol) diethylaminomethane-phosphonate having 3.5% N, 7.8% P and a hydroxyl number of 281.

*Example 3*

To a solution of 45 grams (1 mole) of dimethylamine and 75 grams (1 mole) of 40% aqueous formaldehyde were added 314 grams (1 mole) of bis (dipropylene glycol) hydrogen phosphite. After the exothermic reaction subsided, volatiles were removed in vacuo to leave an orange liquid residue of essentially pure bis (dipropylene glycol) dimethylaminomethanephosphonate having 3.8% N, 8.3% P, hydroxyl number 302.

The same product can be prepared by heating 1 mole of tetramethyldiaminomethane with 1 mole of bis(dipropylene glycol) hydrogen phosphite.

*Example 4*

The procedure of Example 2 was repeated replacing the diethyl amine by 1 mole of diallyl amine to produce bis (dipropylene glycol) diallylaminomethanephosphonate. In addition to the use of the other products, this material also can be polymerized to form resins which can be molded into cups, etc.

*Example 5*

The procedure of Example 2 was repeated using 1 mole of bis(diethylene glycol) hydrogen phosphite to produce bis(diethylene glycol) diethylaminomethanephosphonate.

*Example 6*

The procedure of Example 3 was repeated replacing the bis (dipropylene glycol) hydrogen phosphite by 1 mole of a random mixture of dipropylene glycol-diethylene glycol hydrogen phosphite prepared by reaction of a mixture of ethylene oxide and propylene oxide with phosphorous acid. The product was a mixture of dipropylene glycol-diethylene glycol dimethylaminomethanephosphonates.

Example 7

To 105 grams (1 mole) of diethanolamine was added 75 grams (1 mole) of 40% aqueous formaldehyde and 314 grams (1 mole) of bis (dipropylene glycol) hydrogen phosphite in the manner described in Example 2. After removing the volatiles, e.g., water, in vacuo (10 mm.), there remained bis (dipropylene glycol) bis (2-hydroxyethyl) aminomethanephosphonate, a viscous light orange oil, 3.2% N, 7.2% P, hydroxyl number 520 and having the formula $$\begin{array}{c} DPG \\ \diagdown \\ DPG \end{array} \!\! \begin{array}{c} O \\ \| \\ P-CH_2-N \end{array} \!\! \begin{array}{c} CH_2CH_2OH \\ \diagdown \\ CH_2CH_2OH \end{array}$$

where DPG stands for dipropylene glycol with one of the hydroxyl hydrogens removed.

Example 8

Example 7 was repeated replacing the diethanolamine by 1 mole of diisopropanolamine to produce bis(dipropylene glycol) bis(2-hydroxy-propyl) aminomethanephosphonate.

Example 9

Example 7 was repeated replacing the diethanolamine by 1 mole of dibutanolamine to produce bis(dipropylene glycol) bis (4-hydroxybutyl) aminomethanephosphonate.

Example 10

Example 7 was repeated replacing the bis (dipropylene glycol) hydrogen phosphite by 1 mole of bis(diethylene glycol) hydrogen phosphite to produce bis (diethylene glycol) bis(2-hydroxyethyl)-aminomethanephosphonate.

Example 11

Example 7 was repeated but using as the phosphite 1 mole of bis(tripropylene glycol) hydrogen phosphite to produce bis(tripropylene glycol) bis(2-hydroxyethyl)-aminomethanephosphonate.

Example 12

The procedure of Example 7 was repeated but using as the phosphite 1 mole of bis(triethylene glycol) hydrogen phosphite to produce bis(triethylene glycol) bis(2-hydroxyethyl) aminomethanephosphonate.

Example 13

The procedure of Example 7 was repeated but using 1 mole of bis(polypropylene glycol 425) hydrogen phosphite as the phosphite to produce bis(polypropylene glycol 425) bis(2-hydroxyethyl) aminomethanephosphonate.

Example 14

The procedure of Example 7 was repeated but using as the phosphite 1 mole of bis(4-hydroxybutyl) hydrogen phosphite to produce bis(4-hydroxybutyl) bis(2-hydroxyethyl) aminomethanephosphonate.

Example 15

The procedure of Example 7 was repeated but using as the phosphite 1 mole of bis(1,2-dibutylene glycol) hydrogen phosphite to produce bis(1,2-dibutylene glycol) bis-(2-hydroxyethyl) aminomethanephosphonate.

Example 16

The procedure of Example 7 was repeated but using as the phosphite 820 grams (1 mole) of bis(PeP 450) hydrogen phosphite to give bis(PeP 450) bis(2-hydroxyethyl) aminomethanephosphonate, a compound with 8 functional hydroxyl groups containing 1.5% N, 3.3% P and a hydroxyl number of 475.

Example 17

The procedure of Example 7 was repeated but using as the phosphite 1 mole of bis(LG-56) hydrogen phosphite to produce bis(LG–56) bis(2-hydroxyethyl) aminomethanephosphonate.

Example 18

The procedure of Example 7 was repeated but using as the phosphite 1 mole of bis(trimethylol-propane-propylene oxide adduct molecular weight 400) hydrogen phosphite to produce bis(trimethylol-propylene oxide adduct molecular weight 400) bis(2-hydroxyethyl) aminomethanephosphonate.

Example 19

The procedure of Example 7 was repeated but using as the phosphite 1 mole of bis(Voranol RS-530) hydrogen phosphite to produce bis(Voranol RS-530) bis(2-hydroxyethyl) aminomethanephosphonate.

Example 20

The procedure of Example 7 was repeated but using as the phosphite 1 mole of bis(LHT 240) hydrogen phosphite to produce bis(LHT 240) bis(2-hydroxyethyl) aminomethanephosphonate.

Example 21

The procedure of Example 7 was repeated but using as the phosphite 1 mole of bis(LS–650) hydrogen phosphite to produce bis(LS–650) bis(2-hydroxyethyl) aminomethanephosphonate.

Example 22

247 grams (0.5 mole) of tris(dipropylene glycol) dihydrogen diphosphite were added with stirring and external cooling to a mixture of 75 grams (1 mole) of 40% aqueous formaldehyde and 105 grams (1 mole) of diethanolamine. When the exothermic reaction was over, the volatiles were removed in vacuo, gradually raising the temperature to 90° C. at 10 mm. The light orange liquid hexol produced was tris(dipropylene glycol) di[bis(2-hydroxyethyl) aminomethanephosphonate] having 3.9% N, 8.7% P, and a hydroxyl number of 470 and having the formula $$HO-\left[DPG^*-\underset{\underset{O}{\overset{\|}{P}}}{\overset{\underset{CH_2}{\overset{N(CH_2CH_2OH)}{|}}}{|}}\right]_n DPG$$

where DPG is dipropylene glycol from which one hydroxyl hydrogen has been removed and DPG* is dipropylene glycol from which both hydroxyl hydrogens have been removed and $n$ is 2.

Example 23

225 grams (0.33 mole) of tetrakis dipropylene glycol trihydrogentriphosphite was added with stirring and external cooling to a mixture of 75 grams (1 mole) of 40% aqueous formaldehyde and 105 grams (1 mole) of diethanolamine. After the reaction was completed, volatiles were removed by heating in vacuo to a final temperature of 90° C. at 10 mm. The orange liquid octol product had 4.1% N, 9.1% P, a hydroxyl number of 450 and the same formula as the product of Example 22 except $n$ was 3 rather than 2.

Example 24

628 grams (2 moles) of bis(dipropylene glycol) hydrogen phosphite was added to a mixture of 86 grams (1 mole) of piperazine and 150 grams (2 moles) of 40% aqueous formaldehyde. After the exothermic reaction was completed, volatiles were removed by heating in vacuo to a final temperature of 90° C. at 10 mm. The clear, orange viscous liquid product was 1,4-bis(bis-(dipropylene glycol)phosphonatemethyl) piperazine having 3.8% N, 8.4% P, and a hydroxyl number of 304.

By replacing the bis(dipropylene glycol) hydrogen phosphite in Example 24 with 1 mole of tris(dipropylene glycol) dihydrogen diphosphite a linear polymer is produced.

*Example 25*

The procedure of Example 7 was repeated replacing the formaldehyde by 1 mole of butyraldehyde. The product was bis(dipropylene glycol) bis(2-hydroxyethyl) aminobutanephosphonate.

*Example 26*

The procedure of Example 7 was repeated replacing the formaldehyde by 1 mole of acrolein. The product was bis(dipropylene glycol) bis(2-hydroxyethyl) aminopropenephosphonate.

*Example 27*

The procedure of Example 7 was repeated replacing the formaldehyde by 1 mole of benzaldehyde. The product was bis(dipropylene glycol) bis(2-hydroxyethyl) amino-(phenyl) methanephosphonate.

*Example 28*

The procedure of Example 7 was repeated replacing the formaldehyde by 1 mole of furfural. The product was bis(dipropylene glycol) bis(2-hydroxyethyl) amino furylmethanephosphonate.

*Example 29*

The procedure of Example 7 was repeated replacing the formaldehyde by 1 mole of methyl ethyl ketone. The product was bis (dipropylene glycol) bis 2(2'-hydroxyethyl) aminobutanephosphonate.

*Example 30*

628 grams (2 moles) of bis(dipropylene glycol) hydrogen phosphite were added to a solution of 210 grams (2 moles) of diethanolamine and 400 grams (1 mole) of 25% aqueous glutaraldehyde with stirring and external cooling. When the reaction was completed, volatiles were removed by heating in vacuo to a final temperature of 90° C. at 10 mm. The residue was an octoldiaminodiphosphonate having the formula

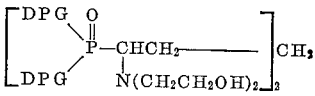

having 2.8% N, 6.2% P and a hydroxyl number of 450.

When the bis(dipropylene glycol) hydrogen phosphite is replaced in Example 30 by 2 moles of tris(dipropylene glycol) dihydrogen diphosphite, the product is a linear phosphonate having a recurring bis(2-hydroxyethyl) amino group on each unit of the chain.

As previously indicated, the products of the present invention are particularly useful in preparing fire-resistant polyurethane foams and elastomers. They can be the sole hydroxyl reactant or they can be used in admixture with other polyhydroxy compounds (polyols) in forming the polyurethanes.

Foamed polyurethanes can be obtained by adding water prior to or simultaneously with the addition of the organic polyisocyanate.

Alternatively, foams can be prepared by uniformly distributing a liquefied halogen substituted alkane containing at least one fluorine atom in its molecule and which vaporizes at or below the temperature of the foaming mass. Such fluorine containing compounds include trichloromonofluoromethane, dichlorodifluoromethane, dichloromonofluoromethane, chlorodifluoromethane, trichlorotrifluoroethane, dichlorotetrafluoroethane and dichlorohexafluoroprane. The foams can be formed with such fluorine containing compounds in the manner described in General Tire British Patent 821,342 or Barnes United States Patent 3,022,256. If desired, water can be used in conjunction with the liquefied fluorine containing haloalkane. Volatile hydrocarbons such as pentane can also be employed as the expanding agent.

The foamed polyurethanes can be made by either the one shot or two step method.

The polyurethanes prepared according to the present invention are solids. In addition to the uses previously set forth, they can be employed as shock absorbent filling for packages, sound insulation blocks, pipe insulation, upholstery filling material, carpet underlays, hair curlers, cigarette and pipe filters, building panels and other forms of insulation, textile linings, threads, e.g., for girdles and brassieres.

The polyurethanes formed can be cured in conventional fashion, e.g., in an oven at 110° C.

As examples of organic polyisocyanates which can be used to make the polyurethanes there can be employed toluene-2,4-diisocyanate;
toluene-2,6-diisocyanate;
4-methoxy-1,3-phenylene diisocyanate;
diphenyl methane-4,4'-diisocyanate;
4-chloro-1,3-phenylene diisocyanate;
4-isopropyl-1,3-phenylene diisocyanate;
2,4-diisocyanate-diphenylether;
3,3'-dimethyl-4,4'-diisocyanatodiphenyl methane;
mesitylene diisocyanate;
durylene diisocyanate;
4,4'-methylene bis(phenylisocyanate);
benzidine diisocyanate;
4,4'-diisocyanate dibenzyl;
3,3'-bitolylene-4,4'-diisocyanate;
1,5-naphthylene diisocyanate;
cumene-2,4-diisocyanate;
9,10-anthracene diisocyanate;
tetramethylene diisocyanate;
hexamethylene diisocyanate;
decamethylene diisocyanate;
toluene-2,4,6-triisocyanate;
tritolylmethane triisocyanate, 2,4,4'-
    triisocyanatodiphenyl ether;
phenylene diisocyanate;
o-, m-, and p-xylene diisocyanates.

The reaction product of toluene diisocyanate with trimethylolpropane at an NCO/OH ratio of 2:1 (Mondur CB); the reaction product of toluene diisocyanate with 1,2,6-hexanetriol at an NCO/OH ratio of 2:1; the reaction product of toluene diisocyanate with a polyol phosphite at an NCO/OH ratio of 2:1, e.g., when the polyolphosphite is dipropylene glycol tetrol diphosphite or tris-(dipropylene glycol phosphite); as well as polyisocyanates listed in Siefken (Annalen, vol. 562, pages 122–135, 1949), can be used.

There can also be used polymethylene polyphenylisocyanate molecular weight 380 to 400, having an isocyanate equivalent of 135 (maximum), a viscosity of 400 centipoises (maximum) at 25° C., a NCO content of 31% (minimum), an acid value (p.p.m. of H+) of 200 (maximum). This material is sold comercially under the trademark PAPI. There can also be used bitolylene diisocyanate (TODI) and dianisidine diisocyanate (DADI).

PAPI is particularly useful in forming rigid polyurethane foams.

Also, there can be used Nacconate 4040, a commercial 2,4-toluenediisocyanate.

Alternatively, as the polyisocyanate there can be used prepolymers made by reacting one or more of the above polyisocyanates with a polyhydroxyl compound. The prepolymers should have terminal isocyanate groups. To insure this, it is frequently desirable to employ an excess of 5% or more of the polyisocyanate in forming the prepolymer.

Typical examples of such prepolymers having isocyanate end groups are those formed from toluene diisocyanate and polyhydroxy compounds. Unless otherwise indicated, in the illustrative examples a mixture of 80% 2,4-isomer and 20% 2,6-isomer of toluene diisocyanate was employed in making the prepolymer. Thus, there can be used the prepolymers from toluene diisocyanate and castor oil, toluene diisocyanate and blown linseed oil, toluene diisocyanate and the polyester of ethylene glycol, propylene glycol and adipic acid having a molecular weight of 1900 described in Example I of Kohrn Patent 2,953,839, toluene diisocyanate and polytetramethylene glycol (1000 molecular weight), toluene diisocyanate and polypropylene glycol (molecular weight 2025), toluene diisocyanate and dipropylene glycol, toluene diisocyanate and LG–56 (glycerine propylene oxide adduct molecular weight of 3000), hexamethylene diisocyanate and pentaerythritol, toluene diisocyanate and sucrose, toluene diisocyanate and polyethylene sebacate, toluene diisocyanate and a mixture of 98% polypropylene glycol molecular weight 1900 with 2% 1,2,6-hexanetriol, toluene diisocyanate and a copolymer of ethylene oxide and propylene oxide having a molecular weight of 2000, toluene diisocyanate and a mixture of polypropylene ether glycol molecular weight 995 and castor oil described in Example 2 of Kane Patent 2,955,091, toluene diisocyanate and tris (dipropylene glycol) phosphite, toluene diisocyanate and tris (octakis (2-hydroxypropyl) sucrose) phosphite, toluene diisocyanate and dipropylene glycol hydroxy proproxypropene phosphonate.

As previously stated, the polyol phosphonates of the present invention can be the sole hydroxyl reactant present or they can be used in admixture with other polyhydroxy compounds in forming the polyurethanes. Examples of such compounds are polyethylene glycols having molecular weights of 400 to 3000; polypropylene glycols having molecular weights of 400 to 3000; ethylene glycol; diethylene glycol; triethylene glycol; propylene glycol; dipropylene glycol; tripropylene glycol; thiodiglycol; glycerol; trimethylolethane; trimethylolpropane; ether triols from glycerine and propylene oxide having molecular weights of 1000 and 3000, other containing triols from 1,2,6-hexane triol and propylene oxide having molecular weights of 750, 1500, 2400 and 4000; sorbitol-propylene oxide adduct molecular weight 1000; pentaerythritol-propylene oxide adduct molecular weight 1000; trimethylolphenol; octakis (2-hydroxypropyl) sucrose, pentaerythritol; castor oil; blown linseed oil; blown soya oil; N,N,N',N'-tetrakis(2-hydroxypropyl) ethylene diamine; mixed ethylene glycol-propylene glycol adipate resin molecular weight 1900; polyneopentylene sebacate; reaction product of 1 mole of trimethylolpropane with 3000 to 12,000 molecular weight units of 1,4-butanediol-adipic acid polyester; oxypropylated p-tertiary butylphenol-formaldehyde resin of Example 2b of De Groote United States Patent 2,499,365; tris (dipropylene glycol) phosphite; tris(octakis (2-hydroxypropyl) sucrose) phosphite and the corresponding phosphonate; tris(polypropylene glycol 2025) phosphite; dipropylene glycol tetrol diphosphite; bis(dipropylene glycol) hydroxypropoxypropane phosphonate; penta hydroxyethyl dextrose; bis polypropylene glycol 2025 ester of hydroxypolypropoxypropane phosphonic acid (wherein the hydroxy polypropoxypropane group has a molecular weight of about 2025); bis diethylene glycol ester of hydroxyethoxyethane phosphonic acid, bis tripropylene glycol ester of butanephosphonic acid.

From 5 to 100% by weight of the hydroxyl component can be the phosphonate of the present invention.

In preparing the cured and/or foamed polyurethanes any of the conventional catalysts can be employed, e.g., sodium hydroxide, sodium methylate, sodium phenolate, tertiary amines, e.g., N-methyl morpholine, N-ethyl morpholine, 1,2,4-trimethylpiperazine, trimethyl amine, triethyl amine, tributyl amine and other trialkyl amines. The esterification product of 1 mole of adipic acid and 2 moles of diethyl ethanolamine, triethyl amine citrate, 3-morpholinopropionamide, 2 - diethylamineacetamide, triethylene diamine, N,N,N',N'-tetrakis (2-hydroxypropyl) ethylene diamine, tribenzyl amine, N,N'-dimethylpiperazine, N,N-dimethyl hexahydroaniline, 2,2,1-diazabicyclooctane, 1,2-dimethylimidazole, arsenic trichloride, antimony pentachloride, titanium tetrachloride, dioctyl lead diacetate, octylene glycol titanate can be employed. There can also be used tin compounds having at least one direct carbon to tin valence bond, e.g., hydrocarbon tin acylates such as dibutyltin dilaurate, dibutyltin dioctoate, tributyltin monolaurate, dimethyltin diacetate, dibutyltin maleate, hydrocarbon tin alkoxides, e.g., dibutyltin diethoxide and dibutyltin dimethoxide, octyl stannoic acid, trimethyltin hydroxide, trimethyltin chloride, triphenyltin hydride, triallyltin chloride, tributyltin fluoride, dibutyltin dibromide, bis(carboethoxymethyl)tin diiodide, tributyltin choride, trioctyltin acetate, butyltin trichloride, octyltin tris(thiobutoxide), dimethyltin oxide, stannous octanoate, dioctyltin oxide, diphenyltin oxide, stannous oleate, as well as the other tin compounds set forth in Hostettler French Patent 1,212,252 and Barnes United States Patent 3,022,256.

There can also be used a small amount, e.g., 0.001 to 10% by weight of the total ingredients of a stabilizing or thickening agent, e.g., methoxylated cellulose, ethyl cellulose, hydroxyethyl cellulose, benzyl cellulose, cellulose acetate, cellulose acetate butyrate, hydroxyethyl polyvinyl alcohol, polyvinyl chloride, polymerized methyl methacrylate.

Fillers can be added in amounts up to 20% by weight, e.g., clay, diatomaceous earth, powdered aluminum and beryllium, vermiculite, cork, bark, foamed polystyrene, foamed polyethylene and foamed polypropylene can be used.

Conventional surfactants can be added in an amount of 0.1 to 5% by weight of the composition. Preferably, less than 1%, e.g., 0.2%, of surfactant is employed. The preferred surfactants are silicones, e.g., polydimethyl siloxane having a viscosity of 3 to 100 centistokes, trimethoxydimethyl polysiloxane molecular weight 850 copolymerized with a dimethoxypolyethylene glycol of molecular weight 750 as well as any of the other siloxanes disclosed in Hostettler French Patent 1,212,252 and the siloxane-oxyalkylene copolymers having from about 10 to 80% by weight of siloxane polymer and from 90 to 20% by weight of alkylene oxide polymer such as the copolymers described in United States Patent 2,834,748. Silicone oil DC–113 is a block polymer of a polydimethoxypolysilane with a methoxy ether of polyethylene glycol which has a viscosity of 350 centistokes at 77° F. is useful.

In the following examples, unless otherwise indicated, when toluene diisocyanate was employed, it was a mixture of 80% of the 2,4-isomer and 20% of the 2,6-isomer.

*Example 31*

34 grams of bis(dipropylene glycol) bis(2-hydroxyethyl) aminomethanephosphonate, 42 grams of Voranol RS–530 (oxypropylated sucrose having a molecular weight of 856, percent OH of 15.8, OH equivalent 108, OH No. 528 and having 9 mols of propylene oxide per mol of sucrose), 2 grams of Silicone Oil DC–113, 27 grams of trichlorofluoromethane (blowing agent), 0.2 gram dibutyltin dilaurate, and 0.2 gram of N-methylmorpholine were mixed thoroughly together and then 86 grams of Nacconate 4040 were added. This was thoroughly mixed for 20 seconds and then allowed to foam and cure. A rigid product with greater than 90% closed cells was obtained. The product would not support combustion.

*Example 32*

The process of Example 31 was repeated replacing the bis(dipropylene glycol) bis(2-hydroxyethyl) aminomethanephosphonate by 36 grams of bis(dipropylene glycol) bis(2-hydroxyethylaminemethanephosphonate) to form a cured foam.

*Example 33*

The process of Example 31 was repeated replacing the Voranol RS–530 by 51 grams of Niax Polyol LK–380 to produce a similar cured closed cell foamed product.

Example 34

The process of Example 31 was repeated replacing the Voranol RS–530 by 39 grams of the sorbitol-propylene oxide adduct known as LS–490 to produce a closed cell foamed product.

Example 35

The process of Example 31 was repeated replacing the Voranol RS–530 by 100 grams of LHT–240 triol to produce a closed cell foamed product.

Example 36

The process of Example 31 was repeated replacing the bis(dipropylene glycol) bis(2-hydroxyethyl) aminomethanephosphonate by 38 grams of tris(dipropylene glycol) di[bis(2-hydroxyethyl) aminomethanephosphonate] to produce a rigid closed cell foam.

Example 37

Another rigid foam formulation that resulted in a closed cell nonburning product was a mixture of 26 grams bis(dipropylene glycol) bis(2-hydroxyethyl) aminomethanephosphonate, 60 grams of Voranol RS–450 (oxyproylated sucrose having a molecular weight of 1000, percent OH of 13.62, OH equivalent 124.8, OH No. 443 and containing 11.4 mols of propylene oxide per mol of sucrose), 0.2 gram Silicone Oil DC–113, 0.3 gram dibutyltin dilaurate, 0.4 gram N-ethylmorpholine, 22 grams trichlorofluoromethane followed by the addition of 84 grams of Nacconate 4040.

Example 38

The process of Example 31 was repeated replacing the Nacconate 4040 by 87 grams of a mixture of 2,4-toluene diisocyanate and 2,6-toluene diisocyanate.

Example 39

The process of Example 31 was repeated replacing the bis(dipropylene glycol) bis(2-hydroxyethyl) aminomethanephosphonate by 58 grams of 1,4-bis(bis-dipropylene glycol) phosphonatemethyl piperazine to produce a foamed product.

In the claims, when more than one R substituent is present, they can be the same or different.

What is claimed is:

1. A polyurethane comprising the reaction product of a compound having the formula

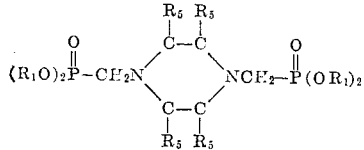

where $R_1O$ is the residue of an oxyalkylated polyhydric alcohol having 2 to 8 hydroxyl groups from which one of the alcoholic hydrogen atoms has been removed from one group, and $R_5$ is selected from the group consisting of hydrogen and alkyl, not over two of $R_5$ being alkyl, said oxyalkylated polyhydric alcohol consisting essentially of carbon, hydrogen and oxygen, the reactive groups of said alcohol being hydroxyl groups and an organic polyisocyanate.

2. A polyuretnane comprising the reaction product of a 1,4-[bis (bis poly lower alkylene glycol) phosphonate methyl] piperazine and an organic polyisocyanate.

3. A polyurethane comprising the reaction product of

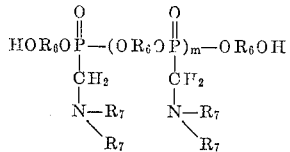

where $R_6$ is a lower alkylene group, $R_7$ is selected from the group consisting of alkyl, carbocyclic aryl, and hydroxyalkyl having at least 2 carbon atoms, and $m$ is an integer of at least 1 and an organic polyisocyanate.

4. A polyurethane comprising the reaction product of tris(dipropylene glycol)di[bis(hydroxy lower alkyl) aminomethane phosphonate] wherein the hydroxy lower alkyl group has at least 2 carbon atoms and an organic polyisocyanate.

5. A polyurethane comprising the reaction product of a compound having the formula

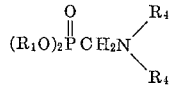

where $R_1O$ is the residue of an oxyalkylated polyhydric alcohol having 2 to 8 hydroxyl groups from which one of the alcoholic hydrogen atoms has been removed from one group, said alcohol consisting essentially of carbon, hydrogen and oxygen, the reactive groups of said alcohol being hydroxyl groups and $R_4$ is an alkenyl group having 3 to 4 carbon atoms with an organic polyisocyanate.

6. A polyurethane comprising the reaction product of a bis (poly lower alkylene glycol) bis (alkenyl) amino methane phosphonate wherein the alkenyl groups have 3 to 4 carbon atoms each with an organic polyisocyanate.

7. A polyurethane comprising the reaction product of a compound having the formula

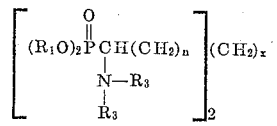

wherein $R_1O$ is the residue of an oxyalkylated polyhydric alcohol having 2 to 8 hydroxyl groups from which one of the alcoholic hydrogen atoms has been removed from one group, said alcohol consisting essentially of carbon, hydrogen and oxygen, the reactive groups of said alcohol being hydroxyl groups, $R_3$ is a hydroxy alkyl group having at least two carbon atoms, $n$ is selected from the group consisting of zero and an integer and $x$ is selected from the group consisting of zero and one with an organic polyisocyanate.

8. A polyurethane comprising the reaction product of a 1,4-(bis(bis poly lower alkylene glycol) phosphonate methyl) piperazine with an organic polyisocyanate.

References Cited by the Examiner
UNITED STATES PATENTS 3,134,742  5/1964  Wismer et al. _____ 260—2.5

LEON J. BERCOVITZ, *Primary Examiner.*

DONALD E. CZAJA, *Assistant Examiner.*